(12) United States Patent
Park et al.

(10) Patent No.: US 8,565,971 B2
(45) Date of Patent: Oct. 22, 2013

(54) HIGH VOLTAGE BATTERY COOLING CONTROL TECHNIQUE FOR A VEHICLE

(75) Inventors: Hyun Soo Park, Hwaseong (KR); Suk Hyung Kim, Hwaseong (KR); Jae Hoon Choi, Gunpo (KR); Do Kyoung Lim, Hwaseong (KR); O Young Ahn, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/323,660

(22) Filed: Dec. 12, 2011

(65) Prior Publication Data

US 2013/0090805 A1    Apr. 11, 2013

(30) Foreign Application Priority Data

Oct. 5, 2011    (KR) .......................... 10-2011-0100995

(51) Int. Cl.
*H02H 7/18*    (2006.01)

(52) U.S. Cl.
USPC .......................................... 701/36; 307/10.7

(58) Field of Classification Search
None
See application file for complete search history.

(56) References Cited

U.S. PATENT DOCUMENTS

| | | | | |
|---|---|---|---|---|
| 5,937,664 | A * | 8/1999 | Matsuno et al. | 62/259.2 |
| 7,004,233 | B2 * | 2/2006 | Hasegawa et al. | 165/47 |
| 7,735,331 | B2 * | 6/2010 | Zhu et al. | 62/259.2 |
| 2008/0139102 | A1 * | 6/2008 | Major | 454/139 |
| 2010/0090527 | A1 * | 4/2010 | Tarnowsky et al. | 307/10.7 |
| 2010/0239894 | A1 * | 9/2010 | Saito et al. | 429/50 |
| 2011/0136424 | A1 * | 6/2011 | Park et al. | 454/75 |

FOREIGN PATENT DOCUMENTS

JP    2008-132855 A    6/2008

* cited by examiner

*Primary Examiner* — Thomas Tarcza
*Assistant Examiner* — Garrett Evans
(74) *Attorney, Agent, or Firm* — Edwards Wildman Palmer LLP; Peter F. Corless

(57) ABSTRACT

The present invention relates to a high voltage battery cooling control technique that improves the operational stability of a high voltage battery by decreasing the likelihood that the battery will overheat due to the indoor air temperature of the vehicle.

8 Claims, 2 Drawing Sheets

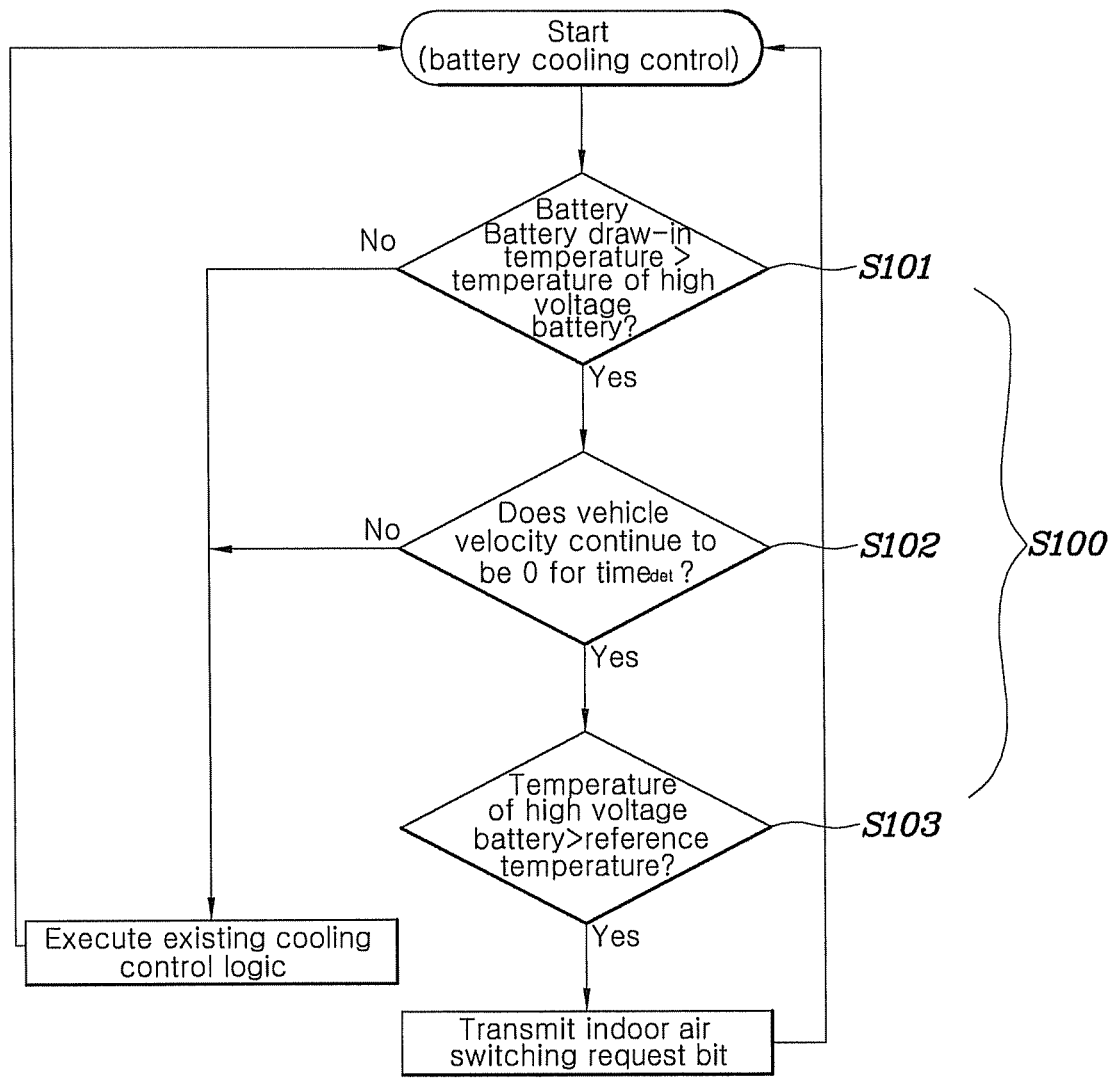

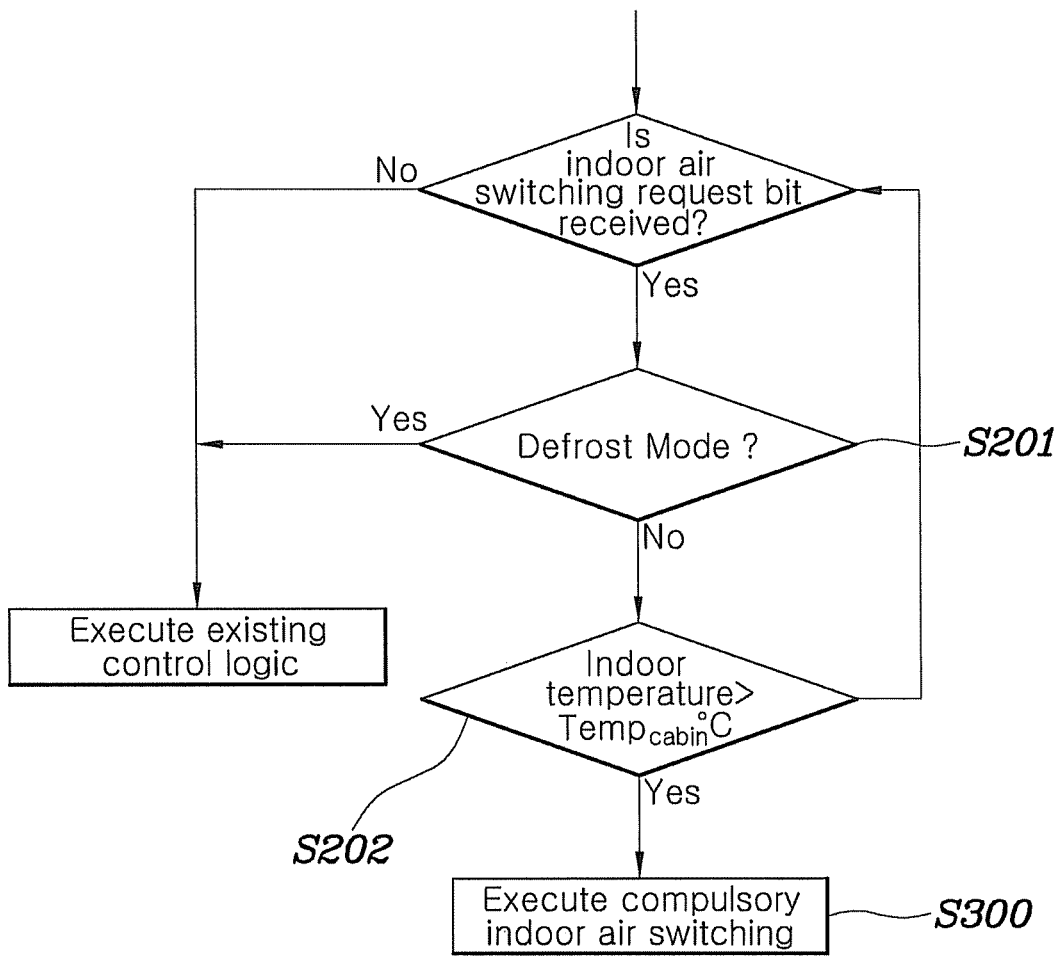

HIGH VOLTAGE BATTERY COOLING CONTROL TECHNIQUE FOR A VEHICLE

CROSS-REFERENCE TO RELATED APPLICATION

This application claims under 35 U.S.C. §119(a) the benefit of Korean Patent Application No. 10-2011-0100995, filed Oct. 5, 2011, the entire contents of which are incorporated herein by reference.

BACKGROUND (a) Technical Field

The present invention relates to a high voltage battery cooling control technique for a vehicle. More particularly, the present invention relates to a technology that suppresses or prevents the temperature of a high voltage battery from increasing excessively while a vehicle is left in an idle state in the daytime in an area having direct exposure to sunlight.

(b) Background Art

An environmental vehicle with a high voltage battery, such as a hybrid vehicle, includes a cooling device for appropriately cooling the high voltage battery. The cooling device should use an appropriate control method to control the cooling of the battery so as to prevent the high voltage battery from being overheated.

In the conventional art, such methods of cooling the high voltage battery typically use air cooling. For example, air in a vehicle is drawn in and flows over the high voltage battery, thereby cooling the battery using the air. However, a disadvantage of this conventional art method is that the temperature of the air in the vehicle can vary significantly, thereby decreasing the efficiency with which it can cool the high voltage battery. For example, air temperature within the vehicle varies due to a variety of factors such as operation of an air-conditioner or a heater, outdoor air temperature, and the like. In some cases, the temperature of the air in the vehicle is too high to suitable for cooling the high voltage battery, which may make it impossible to adequately cool the battery. When the high voltage battery cannot be adequately cooled, it may be impossible for the vehicle to travel due to the generation of an excessive temperature of the high voltage battery.

As an example, when the outdoor air temperature is high, and the vehicle is left in an idle state in an area having direct exposure to sunlight (e.g., an area with no shade), the indoor air temperature of the vehicle may become excessively high. In this case, the high voltage battery is subjected to an over-temperature state. Disadvantageously, the conventional art does not provide an appropriate countermeasure with which to deal with the case where the indoor air temperature of the vehicle is too high to adequately cool the high voltage battery.

The above information disclosed in this Background section is only for enhancement of understanding of the background of the invention.

SUMMARY OF THE DISCLOSURE

The present invention has been made in an effort to provide a high voltage battery cooling control technique for a vehicle in which operational stability of a high voltage battery is improved by significantly decreasing the likelihood that the high voltage battery will overheat as a result of, for example, an increase in the indoor air temperature of the vehicle. Accordingly, the cooling control techniques of the present invention increase the safety performance of a vehicle including a high voltage battery.

The present invention provides a high voltage battery cooling control technique for a vehicle that includes: analyzing a switching condition to determine whether the temperature of air which is drawn in from a room of the vehicle in order to cool a high voltage battery, a vehicle velocity, and the temperature of the high voltage battery meet a predetermined indoor air switching request condition; and a compulsory indoor air switching step of switching a mode of the vehicle to an indoor air mode when the temperature of the air, the vehicle velocity, and the temperature of the high voltage battery meet the indoor air switching request condition.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIGS. 1 and 2 are diagrams showing a high voltage battery cooling control technique for a vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9.

Referring to FIGS. 1 and 2, a high voltage battery cooling control technique for a vehicle according to an exemplary embodiment of the present invention includes determining (S100) by a controller whether the interior air temperature used to cool a high voltage battery, a vehicle velocity, and a high voltage battery temperature meet a predetermined indoor air switching request condition; and a switching (S300) a cooling mode of the vehicle to an indoor air mode when the interior air temperature, the vehicle velocity, and the high voltage battery temperature meet the predetermined indoor air switching request condition.

For example, when the predetermined indoor air switching request condition is met, indicating that the high voltage battery may be overheated because the interior air temperature is too high, the cooling mode of the vehicle is switched to an indoor air mode to prevent the interior air of the vehicle from circulated to the high voltage battery. In other words, the interior air is prevented from flowing into or over the high voltage battery in order to insure that the interior air does not unnecessarily increase the high voltage battery temperature.

For example, when the interior air temperature is too high, it may cause the high voltage battery to overheat. It is contemplated within the scope of the invention that such overheating may be prevented by stopping a fan that blows the interior air to the high voltage battery. However, since the temperature of air which is drawn in to cool the high voltage battery is generally measured by a suction temperature sensor installed in the high voltage battery, the temperature of the air used for cooling the high voltage battery is typically known only when the air is already flowing over the high voltage battery, as a result, it is difficult to stop the fan that blows the air to the high voltage battery.

When the interior air temperature drawn in from the interior of the vehicle is higher than the high voltage battery temperature (S101), the vehicle velocity is 0 km/h (S102), and the high voltage battery temperature is higher than a predetermined reference temperature range within which the high voltage battery can be normally operated (S103), the predetermined indoor air switching request condition is met.

For example, when the interior air temperature is higher than the high voltage battery temperature, there is an increased possibility that the high voltage battery temperature will increase. For example, such a situation may occur when the vehicle is left in an idle state. In this situation, is the cooling technique determines whether the vehicle velocity is 0 km/h, and when the high voltage battery temperature is equal to or lower than the predetermined reference temperature range, the high voltage battery can be used normally. Therefore, the mode of the vehicle does not need to be compulsorily switched to the indoor air mode without considering the driver's input. For example, the predetermined reference temperature range in which the high voltage battery can be normally operated is preferably set to a range of about 40° C. to about 50° C. (i.e. 45±5° C.).

The predetermined indoor air switching request condition is preferably met when the vehicle velocity is 0 for over a predetermined reference time (time$_{det}$). The predetermined reference time may be a range such as, for example, about 5 minutes to about 15 minutes (i.e. 10±5 minutes). For example, if the driver leaves the vehicle for a relatively long time (such as, e.g., time$_{det}$ equal to about 5 minutes to about 15 minutes), the indoor air switching request condition is applied (S102).

When the controller determines (S100) that the predetermined indoor air switching request condition is met, a current defrost mode setting state is checked(i.e., whether the defroster is on or off), and only when the vehicle is not in defrost mode (i.e., the defroster is off) (S201) may the compulsory indoor switching step (S300) be executed.

For example, when the vehicle is in defrost mode, this generally indicates that the vehicle is operating in winter time, an outdoor cooling mode may be maintained because the possibility that the high voltage battery will overheat is low. Therefore, even though the predetermined indoor air switching request condition may be met, the compulsory indoor air switching step (S300) will only be executed when the vehicle is not in defrost mode.

As another example, when the controller determines (S100) that the predetermined indoor air switching request condition is met, the compulsory indoor air switching step (S300) may be executed only when the interior air temperature of the vehicle is higher than a predetermined interior air reference temperature range Temp$_{cabin}$ (S202). The predetermined interior air indoor reference temperature range compared with the interior air temperature of the vehicle will preferably be about 45° C. to about 55° C. (i.e. 50±5° C.).

Even though the indoor air switching request condition is met, the possibility that the temperature of the battery will increase is low when the interior air temperature is low. As a result, the compulsory indoor air switching step (S300) is executed by determining the indoor temperature of the vehicle again.

Since both the defrost mode and the interior air temperature may be determined, both conditions are considered in the exemplary embodiment shown in FIG. 2. It is to be understood that may be considered together, or separately, or in any combination with a variety of other exterior or interior vehicle parameters known to one of skill in the art that could be used to establish or modulate when a predetermined indoor air switching request is met (such as, e.g., operation of heated seats, operation of rear window defroster, and the like).

For reference, in FIG. 1, when a controller determines that the predetermined indoor air switching request condition is met, an indoor air switching request bit is transmitted, and as shown in FIG. 2, the transmitted indoor air switching request bit is received and a controller determines whether the vehicle is in defrost mode and/or what the interior air temperature is, before finally executing the compulsory indoor air switching step (S300).

It is contemplated that the process of FIG. 1 and the process of FIG. 2 may be executed by separate controllers. For example, a controller provided in a battery management system (BMS) of the vehicle executes the process of FIG. 1 and a controller of a full automatic temperature control (FATC) executes the process of FIG. 2.

Accordingly, when the interior air temperature becomes high, and there is a risk that the high voltage battery temperature may be increased to a point that may overheat the battery, the cooling mode of the vehicle will be compulsorily set to the indoor air mode, such that the high-temperature interior air cannot be supplied to the high voltage battery, thereby decreasing the likelihood that the high voltage battery temperature will be increased. Accordingly, the stable operation of the high voltage battery is further improved, thereby improving the safety and performance of the vehicle.

Furthermore, the control logic of the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

According to an exemplary embodiment of the present invention, operational stability of a high voltage battery is improved by maximally suppressing the increase in high voltage battery temperature through appropriate control of the high voltage battery cooling mode. The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A high voltage battery cooling control technique tor a vehicle, comprising:
    determining, by a controller, whether an interior air temperature of the vehicle, a vehicle velocity, and a high voltage battery temperature meet a predetermined indoor air switching request condition;
    switching, by the controller, to an indoor air mode when the interior air temperature, the vehicle velocity, and the high voltage battery temperature meet the predetermined indoor air switching request condition, wherein interior air is prevented from being provided to the high voltage battery when in the indoor air mode;
    wherein when the interior air temperature is greater than the high voltage battery temperature, the vehicle velocity is 0 km/h. and the high voltage battery temperature is greater than a predetermined high voltage battery reference temperature range within which the high voltage battery can be normally operated, the predetermined indoor air switching request condition is met;
    determining, by the controller, whether a defroster in the vehicle is on after the controller determines that the indoor air switching request condition is met: and
    switching to the indoor air mode only when the defroster is off.

2. The high voltage battery cooling control technique of claim 1, wherein the predetermined high voltage battery reference temperature range in which the high voltage battery can be normally operated is set 10 a range of about 40° C. to about 50° C.

3. The high voltage battery cooling control technique of claim 1, wherein the predetermined indoor air switching request condition is met when the vehicle velocity is 0 km/h over a predetermined reference time interval range.

4. The high voltage battery cooling control technique of claim 3, wherein the predetermined reference time interval range is about 5 minutes to about 15 minutes.

5. The high voltage battery cooling control technique of claim 3, wherein the predetermined reference time interval range is 10 minutes.

6. The high voltage battery cooling control technique of claim 1, further comprising:
    determining an interior temperature of the vehicle after the controller determines that the indoor air switching request condition is met; and
    implementing the indoor air cooling mode only when the interior temperature of the vehicle is higher than a predetermined interior air temperature reference range.

7. The high voltage battery cooling control technique of claim 6,
    wherein the predetermined interior air temperature reference range is set to be within a range of about 45° C. to about 55° C.

8. A non-transitory computer readable medium containing executable program instructions executed by a controller, comprising:
    program instructions that determine whether an interior air temperature of a vehicle, a velocity of the vehicle, and a high voltage battery temperature of the vehicle meet a predetermined indoor air switching request condition;
    program instructions that switch to an indoor air cooling mode for a high voltage battery when the interior air temperature of a vehicle, the velocity of the vehicle, and the high voltage battery temperature of the vehicle meet the predetermined indoor air switching request condition, wherein interior air is prevented from being provided to the high voltage battery when in the indoor air mode;
    wherein when the interior air temperature is greater than the high voltage battery temperature, the vehicle velocity is 0 km/h, and the high voltage battery temperature is greater than a predetermined high voltage battery reference temperature range within which the high voltage battery can be normally operated, the predetermined indoor air switching request condition is met;
    program instructions that determine whether a defroster in the vehicle is on after the controller determines that the indoor air switching request condition is met; and
    program instructions switches to the indoor air mode only when the defroster is off.

* * * * *